(12) United States Patent
Matsumoto et al.

(10) Patent No.: US 6,784,956 B2
(45) Date of Patent: Aug. 31, 2004

(54) REFLECTIVE TYPE LIQUID CRYSTAL DISPLAY DEVICE

(75) Inventors: Katsumi Matsumoto, Mobara (JP); Iwao Takemoto, Mobara (JP); Hideki Nakagawa, Chiba (JP); Eiichiro Ito, Mobara (JP); Atsumu Iguchi, Mobara (JP); Kenji Kitajima, Sanbu (JP); Masatoshi Furihata, Mobara (JP); Takeshi Ohashi, Mobara (JP); Shigeo Nakamura, Mobara (JP); Kouki Sakai, Koganei (JP)

(73) Assignees: Hitachi, Ltd., Tokyo (JP); Hitachi Device Engineering Co., Ltd., Mobara (JP)

( * ) Notice: Subject to any disclaimer, the term of this patent is extended or adjusted under 35 U.S.C. 154(b) by 376 days.

(21) Appl. No.: 09/908,856

(22) Filed: Jul. 20, 2001

(65) Prior Publication Data

US 2002/0008800 A1 Jan. 24, 2002

(30) Foreign Application Priority Data

Jul. 21, 2000 (JP) ........................................ 2000-226182

(51) Int. Cl.[7] .............................................. G02F 1/1333
(52) U.S. Cl. .......................... 349/110; 349/44; 349/113
(58) Field of Search ................................. 349/110, 155, 349/156, 44, 113

(56) References Cited

U.S. PATENT DOCUMENTS

| | | | |
|---|---|---|---|
| 4,443,064 A | | 4/1984 | Grinberg et al. |
| 5,384,649 A | | 1/1995 | Takimoto et al. |
| 5,461,501 A | | 10/1995 | Sato et al. |
| 5,870,157 A | | 2/1999 | Shimada et al. |
| 6,023,309 A | | 2/2000 | Gogna et al. |
| 6,081,305 A | | 6/2000 | Sato et al. |
| 6,133,976 A | * | 10/2000 | Kimura ...................... 349/138 |
| 6,215,534 B1 | * | 4/2001 | Raj et al. ...................... 349/84 |
| 6,243,146 B1 | * | 6/2001 | Rho et al. ...................... 349/42 |
| 6,259,500 B1 | * | 7/2001 | Kijima et al. ................ 349/113 |
| 6,327,006 B1 | * | 12/2001 | Sato et al. ..................... 349/44 |
| 6,335,772 B1 | * | 1/2002 | Sato et al. ..................... 349/44 |
| 6,636,284 B2 | * | 10/2003 | Sato ........................... 349/110 |
| 2001/0002144 A1 | * | 5/2001 | Yamazaki .................... 349/44 |

FOREIGN PATENT DOCUMENTS

JP           2000-162589            6/2000

* cited by examiner

*Primary Examiner*—Jerome Jackson
*Assistant Examiner*—José R. Díaz
(74) *Attorney, Agent, or Firm*—Antonelli, Terry, Stout & Kraus, LLP

(57) ABSTRACT

A liquid crystal display device includes a first substrate, a second substrate, a liquid crystal layer sandwiched between the first and second substrate, plural reflective electrodes arranged on a surface of the first substrate on a liquid crystal layer side thereof, each of the reflective electrodes being adapted to be supplied with a video signal; and plural light-blocking conductive films disposed below the reflective electrodes with an insulating layer interposed between the light-blocking films and the reflective electrodes. Each of the light-blocking films is electrically connected to a corresponding one of the reflective electrodes, and is disposed to cover at least a portion of spacings between the corresponding one of the reflective electrodes and ones of the reflective electrodes adjacent thereto.

5 Claims, 16 Drawing Sheets

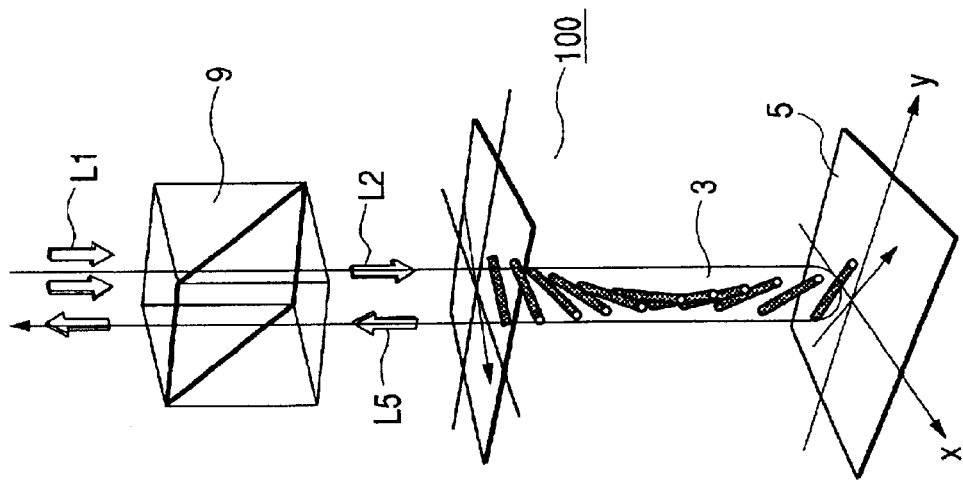
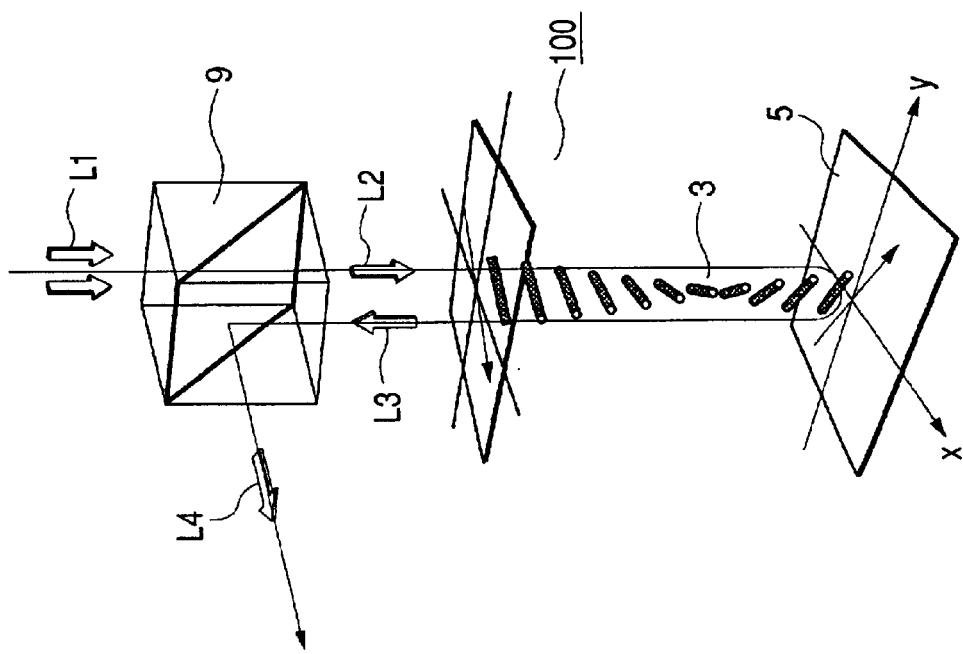

REFLECTIVE TYPE LIQUID CRYSTAL DISPLAY DEVICE

BACKGROUND OF THE INVENTION

The present invention relates a liquid crystal display device useful for a liquid crystal projector which illuminates a liquid crystal display element with light from a light source and projects images on the liquid crystal display element on a screen.

Recently, liquid crystal display devices have been widely used in small-sized display devices, display terminals for office automation equipment and the like. Basically, a liquid crystal display device includes a liquid crystal display panel (also called a liquid crystal display element or a liquid crystal cell) composed of a pair of insulating substrates at least one of which is made of a transparent plate, a transparent plastic plate or the like, and a layer of liquid crystal composition (a liquid crystal layer) sandwiched between the insulating substrates.

The liquid crystal display devices are divided roughly into the simple-matrix type and the active matrix type. In the simple-matrix type liquid crystal display device, a picture element (hereinafter a pixel) is formed by selectively applying voltages to pixel-forming strip electrodes formed on both of the two insulating substrates of the liquid crystal display panel, and thereby changing orientation of a portion of liquid crystal molecules of the liquid crystal composition corresponding to the pixel. On the other hand, in the active-matrix type liquid crystal display device, the liquid crystal display panel is provided with signal lines, pixel electrodes, reference voltage electrodes and active elements each associated with one of the pixel electrodes for pixel selection which are formed on one of the substrates, and a pixel is formed by selecting the active element associated with the pixel and thereby changing orientation of liquid crystal molecules present between a pixel electrode connected to the active element and the reference voltage electrode associated with the pixel electrode.

Generally, the active matrix type liquid crystal display device employs the so-called vertical electric field type in which an electric field for changing orientation of liquid crystal molecules is applied between an electrode disposed on one of a pair of opposing substrate and another electrode disposed on the other of the opposing substrates. Also put to practical use is the so-called horizontal electric field type (also called IPS (In-Plane Switching) type) liquid crystal display device in which an electric field for changing orientation of liquid crystal molecules is applied in a direction approximately in parallel with the major surfaces of the opposing substrates.

Among display devices employing the liquid crystal display device, a liquid crystal projector has been practical use. The liquid crystal projector illuminates a liquid crystal display element with light from a light source and projects images on the liquid crystal display element on a screen. Two types, a reflective type and a transmissive type, of liquid crystal display elements are usable for liquid crystal projector. The reflective type liquid crystal display element is capable of being configured to make approximately the entire pixel area an useful reflective area, and consequently it has advantages of its small size, high definition display and high luminance over the transmissive type liquid crystal display element.

Consequently, a small-sized high-definition liquid crystal projector can be realized by using the reflective liquid crystal display element without decreasing its luminance.

A reflective liquid crystal display element is disclosed in U.S. Pat. No. 5,978,056 issued on Nov. 2, 1999, for example. U.S. Pat. No. 5,978,056 discloses a multilayer light blocking film, but does not disclose the arrangement of two light blocking films spaced from each other in a direction of their thickness.

SUMMARY OF THE INVENTION

The liquid crystal projector has problems of miniaturization, and increasing of resolution and luminance. To solve the problems, the liquid crystal display element used for the liquid crystal projector needs to be further reduced in size, and further increased in resolution and luminance. In reducing the size and increasing the resolution and luminance of the transmissive type liquid crystal display element, it is inevitable that the ratio of a light-transmissive area to the entire area in one pixel (hereinafter the aperture ratio) is reduced considerably.

It is an object of the present invention to provide a reflective liquid crystal display device capable of increasing its luminance, it is another object of the present invention to provide a reflective liquid crystal display element featuring a high image quality, and it is still another object to provide a liquid crystal display element featuring a high image quality by prevention of entering of unwanted light occurring therein and high light utilization efficiency obtained by a higher aperture ratio, and to provide a liquid crystal projector employing the liquid crystal display element.

In accordance with an embodiment of the present invention, there is a liquid crystal display device comprising: a first substrate; a second substrate; a liquid crystal layer sandwiched between the first substrate and the second substrate; a plurality of reflective electrodes arranged on a surface of the first substrate on a liquid crystal layer side thereof, each of the plurality of reflective electrodes being adapted to be supplied with a video signal; and a plurality of light-blocking conductive films disposed below the plurality of reflective electrodes with an insulating layer interposed between the plurality of light-blocking films and the plurality of reflective electrodes, each of the plurality of light-blocking films being electrically connected to a corresponding one of the plurality of reflective electrodes, each of the plurality of light-blocking films being disposed to cover at least a portion of spacings between the corresponding one of the plurality of reflective electrodes and ones of the plurality of reflective electrodes adjacent to the corresponding one of the plurality of reflective electrodes.

In accordance with another embodiment of the present invention, there is a liquid crystal display device comprising: a driving-circuit substrate; a transparent substrate; a liquid crystal layer sandwiched between the driving-circuit substrate and the transparent substrate; a plurality of reflective electrodes arranged on a surface of the driving-circuit substrate on a liquid crystal layer side thereof; a plurality of semiconductor switching elements disposed below the plurality of reflective electrodes, each of the plurality semiconductor elements being configured to supply a signal to a corresponding one of the plurality of reflective electrodes; a first light-blocking film for covering the plurality of semiconductor switching elements; and a plurality of second light-blocking films each disposed to cover at least a portion of spacings between adjacent ones of the plurality of reflective electrodes.

In accordance with another embodiment of the present invention, there is a liquid crystal display device comprising: a first substrate; a second substrate; spacers made of resin for establishing a spacing between the first substrate and the second substrate; a peripheral frame made of the resin and interposed between the first substrate and the second substrate; a liquid crystal component filled in a spaced enclosed by the first substrate, the second substrate and the peripheral frame; a plurality of reflective electrodes arranged on a surface of the first substrate on a liquid crystal layer side thereof; a plurality of dummy electrodes disposed between the plurality of reflective electrodes and the peripheral frame, each of the plurality of dummy electrodes being supplied with a dummy-electrode signal; a plurality of semiconductor switching elements disposed below the plurality of reflective electrodes, each of the plurality of semiconductor elements being configured to supply a signal to a corresponding one of the plurality of reflective electrodes; a first light-blocking film for covering the plurality of semiconductor switching elements; and a plurality of second light-blocking films each disposed to cover at least a portion of spacings between adjacent ones of the plurality of reflective electrodes.

BRIEF DESCRIPTION OF THE DRAWINGS

In the accompanying drawings, in which like reference numerals designate similar components throughout the figures, and in which:

FIGS. 2A and 2B are illustrations of a liquid crystal display element of the electrically controlled birefringence mode for explaining an embodiment of the liquid crystal display device in accordance with the present invention;

DETAILED DESCRIPTION OF THE PREFERRED EMBODIMENTS

The embodiments in accordance with the present invention will now be explained in detail by reference to the drawings.

Figure 1:
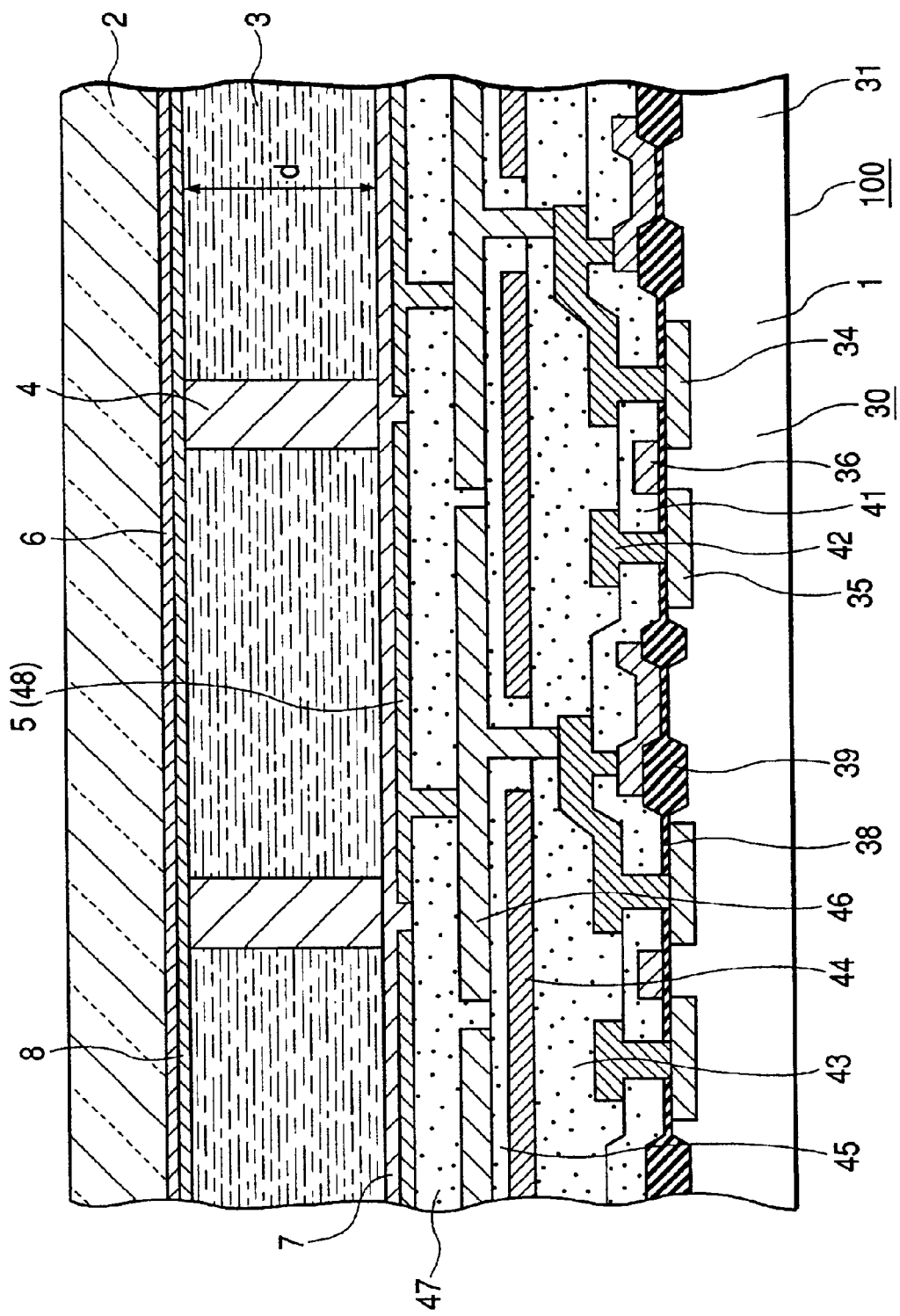
FIG. 1 is a schematic cross-sectional view of a liquid crystal display element for explaining an embodiment of the liquid crystal display device in accordance with the present invention.

FIG. 1 is a schematic cross-sectional view of a liquid crystal display element for explaining an embodiment of the liquid crystal display device in accordance with the present invention.

In FIG. 1, reference numeral 100 denotes a liquid crystal display element, 1 is a driving circuit substrate, 2 is a transparent substrate, 3 is a liquid crystal composition, 4 are spacers. The spacers 4 establish a fixed cell gap d between the driving circuit substrate 1 and the transparent substrate 2 which sandwich the liquid crystal composition 3. Reference numeral 5 denotes a reflective electrode formed on the driving circuit substrate 1, 6 is a counter electrode for applying a voltage across the liquid crystal composition 3 in cooperation with the reflective electrode 5, 7 and 8 are orientation films for orientating liquid crystal molecules of the liquid crystal composition 3 in specified directions, and 30 are active elements for applying a voltage to the reflective electrode 5.

Reference numeral 34 denote source regions, 35 are drain regions, 36 are gate electrodes, 38 are insulating films, 39 are field oxide films for electrically insulating transistors from each other, 41 are first interlayer insulating films, 42 are first conductive films serving as drain signal lines, 43 are second interlayer insulating films, 44 are first light blocking films, 45 are third interlayer insulating films, 46 are second light blocking films, 47 are fourth interlayer insulating films, and 48 are second conductive films forming the reflective electrodes 5.

The conductive film 42 are metal films made of aluminum. The second interlayer insulating films 43 insulate the first conductive films 42 from the first light blocking films 44. The second interlayer insulating films 43 are composed of planarizing films for flattening steps generated by structures on the driving circuit substrate 1 and insulating films covering the planarizing films, the planarizing films are coated by using a SOG (spin-on-glass) technique and the insulating films are made of $SiO_2$ formed by a CVD technique using a reactive gas of TEOS (tetraethylorthosilicate).

The second interlayer insulating films 43 are planarized by polishing using a CMP (Chemical Mechanical Polishing) technique after deposition of the second interlayer insulating films 43.

The first light blocking films 44 are formed on the planarized second interlayer insulating films 43, and they are made of aluminum like the first conductive films 42.

The third interlayer insulating films 45 and the fourth interlayer insulating films 47 are made of the same material as that of the second interlayer insulating films 43, and they are planarized by polishing using the CMP technique after deposition of the third and fourth interlayer insulating films 45, 47, respectively.

The second light blocking films 46 and the reflective electrode 5 are made of aluminum like the first conductive film 42. The third interlayer insulating films 45 are used as dielectric films for obtaining electrostatic capacitances as explained subsequently, and their thickness is preferably in a range of from 150 nm to 450 nm, more preferably about 300 nm, considering their withstand voltage and increasing of their electrostatic capacitances by decreasing their thickness.

First, the reflective type liquid crystal display element will be explained, and the active element 30 and the first and second light blocking films 44, 46 will be described subsequently.

The liquid crystal display element in this embodiment is of the reflective type. Light projected into the liquid crystal display element 100 enters from the transparent substrate 2 (at the top of FIG. 1), then passes through the liquid crystal composition 3, then is reflected back by the reflected electrode 5, then passes through the liquid crystal composition 3 again, then passes through the transparent substrate 2, and leaves the liquid crystal display element 100.

In the liquid crystal display element of the reflective type, when the reflective electrode 5 is disposed on the surface of the driving circuit substrate 1 on its liquid crystal composition 3 side, an opaque substrate such as a silicon substrate can be used as the driving circuit substrate 1. This structure has advantages that the active elements 30 and wiring can be disposed below the reflective electrodes 5, thereby the area of the reflective electrodes 5 can be increased, and consequently, the higher aperture ratio can be realized. Also this structure has an advantage of radiating heat generated by light projected into the liquid crystal display element 100 from the back surface of the driving circuit substrate 1.

Next, operation of the liquid crystal display element employing the electrically controlled birefringence mode will be explained. Light linearly polarized by a polarizer enters the liquid crystal display element 100. When a voltage is applied between the reflective electrode 5 and the counter electrode 6, orientation of liquid crystal molecules of the liquid crystal composition 3 is changed due to their dielectric anisotropy, and as a result the birefringence of the layer of the liquid crystal composition 3 is changed. The electrically controlled birefringence mode generates images by converting the changes of the birefringence into the changes of light transmission.

Next, the single-polarizer twisted nematic (SPTN) mode, which is one type of the electrically controlled birefringence mode, will be explained by reference to FIGS. 2A and 2B.

Reference numeral 9 denotes a polarizing beam splitter which divides an incident light L1 from a light source (not shown) into two polarized lights, and a linearly polarized one L2 of the two.

In FIGS. 2A and 2B, a light having passed through the polarizing beam splitter 9, which is a p-polarized light, is entered into the liquid crystal display element 100, but instead a light reflected by the polarizing beam splitter 9, which is an s-polarized light, can be entered into the liquid crystal display element 100.

The liquid crystal composition 103 is a nematic liquid crystal material having positive dielectric anisotropy. Longitudinal axes of the liquid crystal molecules are oriented approximately in parallel with the major surfaces of the driving circuit substrate 1 and the transparent substrate 2 (see FIG. 1), and the liquid crystal molecules are twisted across the liquid crystal layer by the orientation films 7, 8 (see FIG. 1).

FIG. 2A illustrates a case where no voltage is applied across the layer of the liquid crystal composition 3. The light L2 entering the liquid crystal display element 100 is converted into elliptically polarized light by birefringence of the liquid crystal composition 3, and then becomes approximately circularly polarized light on the reflective electrode 5. The light reflected by the reflective electrode 5 passes through the liquid crystal composition 3 again, thereby becomes elliptically polarized light again, and then returns to linearly polarized light again when it leaves the liquid crystal display element 100. The emergent linearly polarized light L3 is s-polarized light having its direction of polarization rotated through an angle of 90° with respect to that of the incident light L2, enters the polarizing beam splitter 9 again, and then is reflected by an internal interface of the polarizing beam splitter 9 to become emergent light L4 which in turn is projected onto a screen or the like to produce a display. This configuration is of the so-called normally white (normally open) type which emits light when a voltage is not applied across the layer of the liquid crystal composition 3.

FIG. 2B illustrates a case where a voltage is applied across the layer of the liquid crystal composition 3. When an electric field is applied across the layer of the liquid crystal composition 103, the liquid crystal molecules align in a direction of the electric field and consequently, the birefringence of the liquid crystal molecules does not appear. As a result, the linearly polarized light L2 entering the liquid crystal display element 100 is reflected by the reflective electrode 5 without undergoing changes, and then the light L5 emergent from the liquid crystal display element 100 has the same direction of polarization as that of the incident light L2. The emergent light L5 passes through the polarizing beam splitter 9, and returns to the light source such that no light is projected onto the screen and a black display is provided on the screen.

In the single-polarizer twisted nematic mode, the direction of orientation of the liquid crystal molecules is parallel with the major surfaces of the substrates, and therefore usual methods of orientating the liquid crystal molecules can be employed and its manufacturing process is highly stable. The normally white mode operation is preventive of defective displays occurring at low voltage levels. The reason is that, in the normally white mode, a dark level (a black display) is provided when a high voltage is applied across the liquid crystal layer, and in this state, almost all the liquid crystal molecules are orientated in the direction of the electric field which is perpendicular to the major surfaces of the substrates, and consequently, a display of the dark level does not depend very much upon the initial conditions of orientation of the liquid crystal molecules having a low electric field applied thereto.

The human eye perceives non-uniformity in luminance based upon the ratio of luminances, is responsive approximately to the logarithm of luminance, and consequently, is sensitive to variations in dark levels.

Because of the above reasons, the normally white mode has advantages with respect to prevention of non-uniformity in luminance caused by initial conditions of orientation of the liquid crystal molecules.

The electrically controlled birefringence mode requires a highly precise cell gap between the substrates of the liquid crystal display element. The electrically controlled birefringence mode utilizes a phase difference between ordinary rays and extraordinary rays caused while they pass through the liquid crystal layer, and therefore the intensity of the light transmission through the liquid crystal layer depends upon the retardation $\Delta n \cdot d$ between the ordinary and extraordinary rays, where $\Delta n$ is a birefringence and d is a cell gap established by spacers 4 between the transparent substrate 2 and the driving circuit substrate 1 (see FIG. 1).

In the reflective type liquid crystal display element, light entering the liquid crystal layer is reflected by the reflective electrode, and then passes through the liquid crystal layer again, therefore, if the reflective type liquid crystal display element uses a liquid crystal composition having the same birefringence $\Delta n$ as that of a liquid crystal composition used in the transmissive type liquid crystal display element, the cell gap d of the reflective type liquid crystal display element needs to be half that of the transmissive type liquid crystal display element. Generally, the cell gap d of the transmissive liquid crystal display element is in a range of about 5 microns to about 6 microns, and in this embodiment the cell gap d is selected to be about 2 microns.

In this embodiment, to ensure a high accuracy of the cell gap and a smaller cell gap than that of conventional liquid crystal display elements, column-like spacers are fabricated on the driving circuit substrate 1 instead of using a bead-dispersing method.

Figure 3:
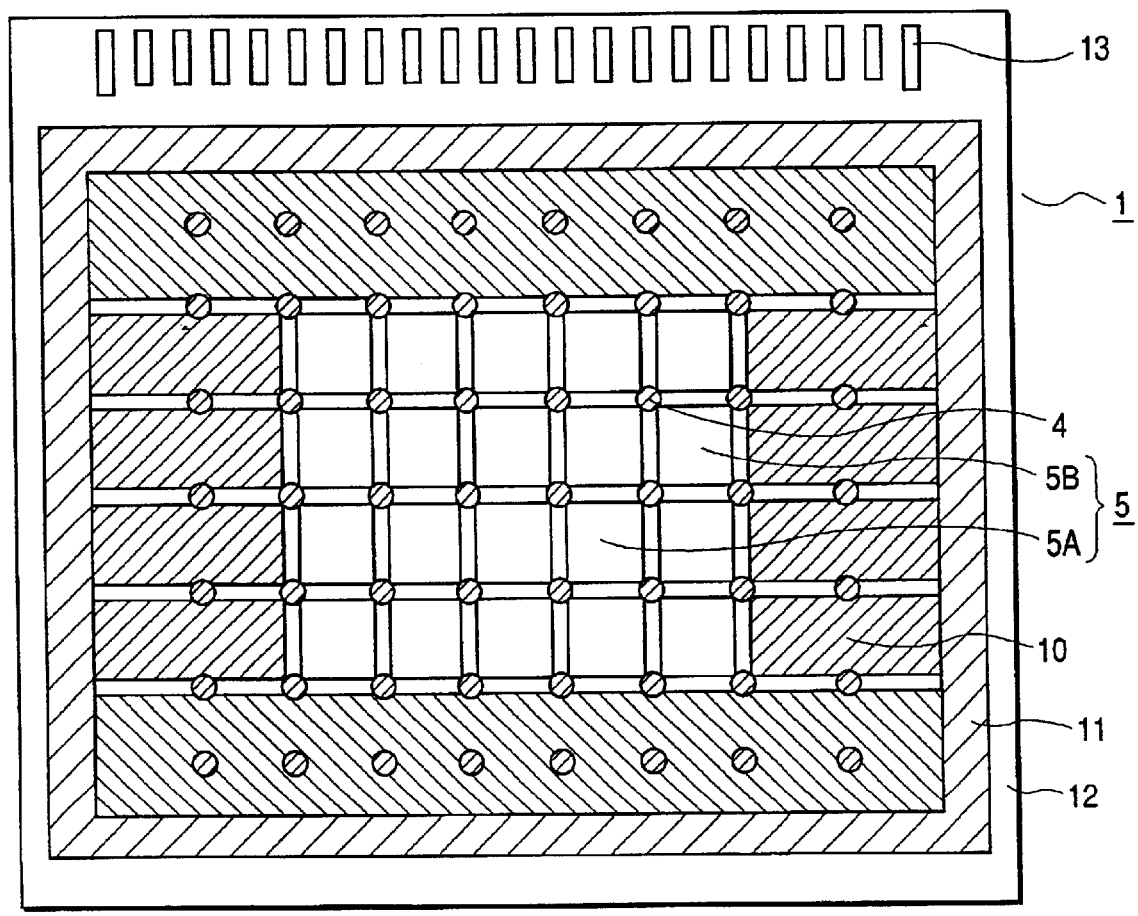
FIG. 3 is a schematic plan view of a liquid crystal display element for explaining an embodiment of the liquid crystal display device in accordance with the present invention.

FIG. 3 is a schematic plan view of a liquid crystal display element for explaining an arrangement of the reflective electrodes 5 and the spacers 4 disposed on the driving circuit substrate 1. A large number of spacers 4 are arranged in a matrix array over the entire area of the driving circuit substrate 1 for establishing a uniform spacing between the transparent substrate 2 and the driving circuit substrate 1. Each of the reflective electrodes 5 defines a pixel serving as the smallest picture element formed by the liquid crystal display element. For the sake of simplicity, FIG. 3 illustrates an array of five columns by four rows of pixels, pixels in the outermost columns and rows are represented by reference numeral 5B, pixels within the outermost columns and rows are represented by reference numeral 5A.

In FIG. 3, the array of five columns by four rows of pixels forms a display area, in which a display by the liquid crystal display element is formed. Dummy pixels 10 are disposed around the display area, a peripheral frame 11 made of the same material as that of the spacers 4 is disposed around the dummy pixels 10, and a sealing member 12 is coated around the peripheral frame 11 on the driving circuit substrate 1. Reference numeral 13 denotes terminals for external connections which are used for supplying external signals to the liquid crystal display element 100.

The spacers 4 and the peripheral frame 11 are formed of resin material. The liquid crystal composition 3 is placed between the driving circuit substrate 1 and the transparent substrate 2, and then is confined within a region enclosed by the peripheral frame 11 after the liquid crystal display element 100 has been assembled (see FIG. 1). A sealing member 12 is coated around the peripheral frame 11 on the driving circuit substrate 101 to seal the liquid crystal composition 3 off in the liquid crystal display element 100. The spacers 4 and the peripheral frame can be made of a resin material such as a chemically amplified negative photoresist "BPR-113" (a trade name) manufactured by JSR Corp. (Tokyo, Japan). The photoresist material is coated as by a spin coating method on the driving circuit substrate 1 having the reflective electrodes 5 formed thereon, then is exposed through a mask having a pattern in the form of the spacers 4 and the peripheral frame 11, and then is developed by a remover to form the spacers 4 and the peripheral frame 11.

The sealing member 12 serves to fix the driving circuit substrate 1 and the transparent substrate 2 together, and also serves to prevent materials harmful to the liquid crystal composition 3 from penetrating thereinto. When the fluid sealing member 12 is applied, the peripheral frame 11 serves as a stopper against the sealing member 12. Provision of the peripheral frame 11 serving as the stopper against the sealing member 12 makes possible it to define the border of the area of the liquid crystal composition 3 and that of the sealing member 12 accurately, and thereby to minimize the necessary inactive regions such as dummy pixels and a sealing region which do not contribute to generation of a display and to reduce the size of the liquid crystal display element. This structure provides a wide latitude in design and thereby makes possible reduction of the region between the display area and the peripheral sides of the liquid crystal display element 100, that is, the reduction of the peripheral border around the display area.

The dummy pixels are disposed between the peripheral frame 11 and the display area for making the quality of the display produced by the outermost pixels 5B equal to that of the display produced by the pixels 5A disposed inside the outermost pixels 5B. The dummy pixels which do not contribute to production of a display, but is similar in structure to that of the pixels in the display area is provided at the peripheral areas surrounding the display area so as to prevent defective displays caused by structural discontinuity at the border between the display area and the peripheral areas surrounding the display area.

The dummy pixels are also intended to prevent occurrence of defective displays in the so-called dot-inversion drive in which adjacent pixels have applied thereto driving voltages of the opposite polarities from each other, and the polarities are inverted periodically.

The pixels 5A disposed inside the outermost pixels 5B will be hereinafter referred to as the inner pixels 5A. By referring to FIG. 4, the purpose of the dummy pixels will be explained. The inner pixels 5A have pixels adjacent to each other, and therefore unwanted electric fields are generated between adjacent of the inner pixels 5A when the column-inversion, line-inversion or dot-inversion driving method is employed. On the other hand, the above-mentioned unwanted electric fields which deteriorate display quality are not generated between the outermost pixels 5B and the areas on the side opposite from the inner pixels 5A when the dummy pixels 10 are not provided, and consequently, the outermost pixels 5B provides a display better in quality than that provided by the inner pixels 5A. A difference in display quality between some of the pixels produces non-uniformity in display. Therefore, the dummy electrodes 10 are provided to the liquid crystal display elements driven the dot-inversion drive method, and are supplied with signals like the pixels 5A, 5B such that display quality provided by the outermost pixels 5B are made equal to that provided by the inner pixels 5A.

In the present embodiment, the column-inversion, line-inversion or dot-inversion driving method is not employed, and therefore a problem of non-uniformity in display does not arise which occurs in the column-inversion, line-inversion or dot-inversion driving. However, when the liquid crystal display element of the present embodiment is driven in the normally white mode, a problem arises in that the dummy pixels 10 appear and degrade display quality if no voltage is applied across the layer of the liquid crystal composition 3. It is conceivable to shield the dummy pixels 10 from light by using a light blocking border, but it is difficult to position the light blocking border accurately at the border of the display area. In view of this, the dummy pixels 10 are supplied with such a voltage to make them produce a black display such that they are observed as a black border surrounding the display area. The width of the dummy pixels 10 disposed inside the peripheral frame 11 are selected to be equivalent to two or more lines of the regular pixels.

Figure 4:
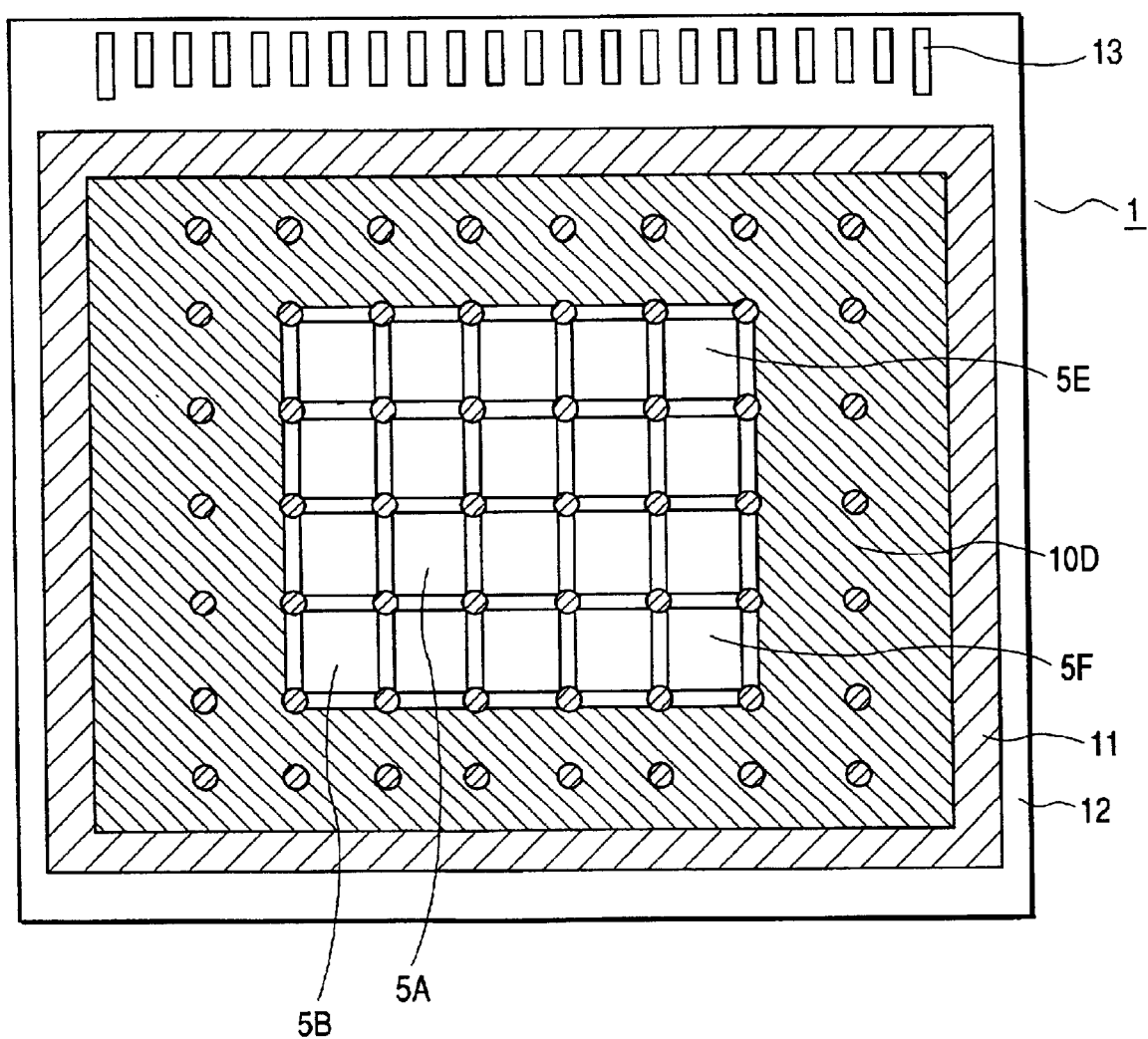
FIG. 4 is a schematic plan view of a liquid crystal display element for explaining an embodiment of the liquid crystal display device in accordance with the present invention.

FIG. 4 illustrates the dummy pixel 10D fabricated in the form of a peripheral frame, and the dummy pixel 10D is supplied with such a voltage to make it produce a black display. When the dummy pixel 10 is shaped as a single electrode in the form of a peripheral frame as shown in FIG. 4, a black display in the form of the peripheral frame is comparatively easily realized around the display area.

However, it was found out that the dummy pixel 10 shown in FIG. 4 produces a defective display at the border between the dummy pixel 10 and the display area.

When an electric field is applied across the layer of the liquid crystal composition 3 in a fixed direction for a long period of time, the liquid crystal composition 3 is deteriorated, and in view of this phenomenon, a so-called AC driving method is known which inverts the polarities of the electric field applied across the layer of the liquid crystal composition 3 periodically. In this embodiment, the frame-inversion drive method is employed which inverts the polarities of signals at all the pixels once per frame time, that is, with twice the frame time.

In the frame-inversion drive method, signals of the same polarity are written into respective ones of the pixels for one frame time. In FIG. 4, writing of signals into the effective pixels in the display area is performed in the scanning order from the top row to the bottom row, and on the other hand, writing of a signal into the dummy pixel 10D is performed at one time because the dummy pixel 10D is in the form of a single electrode. As a result, some of the effective pixels have applied thereto signals of the polarity opposite from that of the signal applied to the dummy pixel 10D for a portion of the period depending upon a time of the period they are scanned, and consequently, effective lateral electric fields between the dummy pixels 10D and effective pixels adjacent thereto become non-uniform depending upon positions of the effective pixels. A typical example of this phenomenon will now be explained by using a case of producing a black display over the entire display area.

In FIG. 4, a black-displaying signal (a high voltage if in the case of the normally white mode) is written into the respective effective pixels at positions from the upper left-hand corner to the lower right-hand corner of the display area sequentially within one frame time. If the black-displaying signal is written into the dummy pixel 10D at the same time the black-displaying signal is written into the effective pixel at the upper left-hand corner with both the black-displaying signals to the dummy pixel 10D and the effective pixels having the same polarity, a lateral electric field is generated between the effective pixel at the lower right-hand corner of the display area and the dummy pixel 10D during approximately the entire frame time, and lateral electric fields are generated between the outermost effective pixels and the dummy pixel 10D for a length of a time difference between times of writing the signals into the outermost effective pixels and the dummy pixel 10D. In the normally white mode, an unwanted lateral electric field produced by the black-displaying signal generates a locally white portion in a black background, that is, if a black display is intended over the entire display area, a white peripheral frame appears between the display area and the dummy pixel and the brightness of the peripheral frame varies from place to place.

Figure 5A:
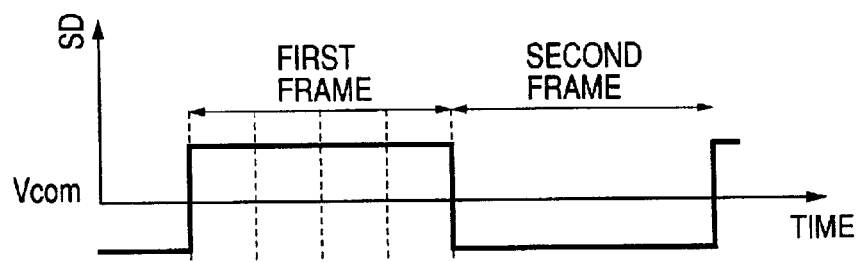
FIGS. 5A–5C are timing charts for explaining operation of a liquid crystal display element in an embodiment of the liquid crystal display device in accordance with the present invention.
Figure 5B:
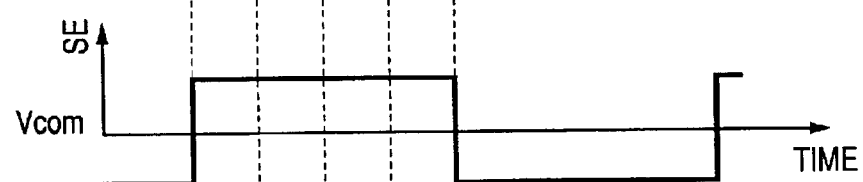
Figure 5C:
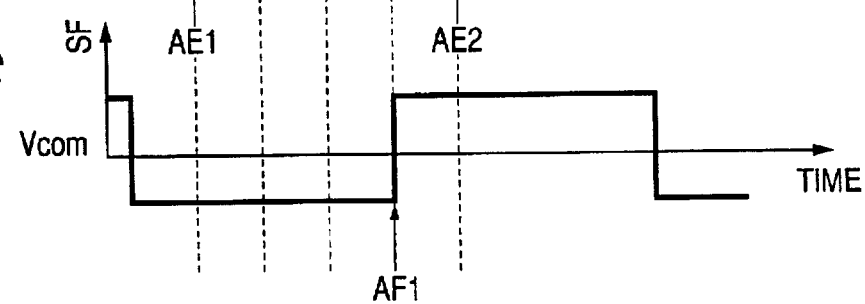

FIGS. 5A–5C illustrate timing charts of video signals in the frame-inversion driving, and differences in writing time will be explained by reference to FIGS. 5A–5C. A signal SE in FIG. 5B represents a video signal which is written into and stored in the pixels 5E in the first row in FIG. 4, a signal SF in FIG. 5C represent a video signal supplied to the pixels 5F in the fourth line, a signal SD represents a black-displaying signal supplied to the dummy pixel 10D, and Vcom in FIGS. 5A–5C represent a voltage applied to the counter electrode 6 (see FIG. 1).

To facilitate understanding, FIGS. 5A–5C illustrates a case in which a black-displaying signal is applied to all the pixels (an all-black display). The order of writing of video signals into the pixels sequentially is from the upper left-hand corner to the lower right-hand corner of the display area in the example shown in FIG. 4, and therefore, first the black-displaying signals are written into the pixels in the first row sequentially, and then the black-displaying video signals are written in the pixels in the second row to the fourth row sequentially in the same way as in the first row. On the other hand, writing of the black-displaying signal into the dummy pixel 10D is performed simultaneously with writing of the signal into the pixels 5E in the first row. The polarity of the video signals in the first frame is positive with respect to the voltage Vcom, and the polarity of the video signals in the second frame is negative with respect to the voltage Vcom.

In FIGS. 5A–5C, the video signal SE is written in the pixels 5E at a time indicated by an arrow AE1, and then is held in the pixels 5E until a time indicated by an arrow AE2. The video signals are written into the pixels line by line from the top row to the bottom row, and therefore the video signals SF are written into the pixels 5F in the fourth row at a time indicated by an arrow AF1. The phase of the video signal SF written into the pixels 5F lags that of the black-displaying signal SD written into the dummy pixel 10D by approximately one frame time. As a result the black-displaying signal SD and the video signal SF are opposite in polarity from each other for approximately one frame time, and therefore unwanted electric fields are generated between the pixels 5F and the dummy pixels 10D. The unwanted electric fields change orientation of molecules of the liquid crystal composition 3 such that locally somewhat white portions appear in a black display in the normally white mode, resulting in non-uniform display.

The above explanation have been made by referring to the pixels 5F in the fourth row, but the pixels in the second and third rows are impressed with the voltages opposite in polarity with respect to the voltage applied to the dummy pixel 10D, and consequently, similar non-uniformity in display are produced by the pixels in the second and third rows, but the degree of the non-uniformity varies depending upon the length of time for which the respective pixels are impressed with the voltages opposite in polarity with respect to the voltage applied to the dummy pixel 10D.

Returning to FIG. 3 again, the embodiment of the present invention will be explained further. To prevent occurrence of non-uniformity caused by the structure of the dummy pixel 10D explained in connection with FIG. 4, the present embodiment employs a structure in which a plurality of dummy pixels are provided such that dummy pixels in adjacent rows are separated from each other as shown in FIG. 3. The black-displaying signal is written into each of the dummy pixels 10 simultaneously with writing of signals into the effective pixels in a corresponding row. That is to say, each of the dummy pixels 10 provided for each row of the effective pixels receives a signal of the same polarity as that of a signal written into the pixels of a corresponding row, and consequently, occurrence of the unwanted electric fields can be prevented and non-uniformity in display can be reduced.

Further, the dummy pixels 10 shown in FIG. 3 are laterally elongated compared with the effective pixels 5A and 5B. The liquid crystal display element 100 is provided with a light blocking frame for blocking unwanted light from illuminating portions other than the display area as described subsequently. Lateral elongation of the dummy pixels 10 provides a larger tolerance to positioning accuracy of the light blocking frame in the liquid crystal display element 100.

Figure 6A:
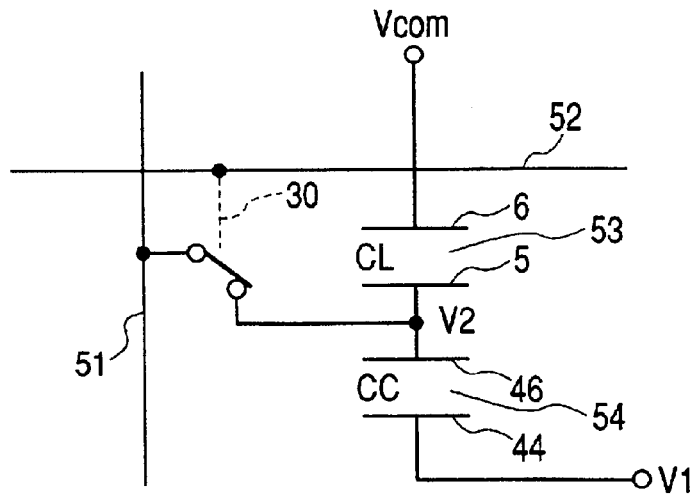
FIGS. 6A and 6B are schematic equivalent circuits for explaining operation of a liquid crystal display element in an embodiment of the liquid crystal display device in accordance with the present invention.
Figure 6B:
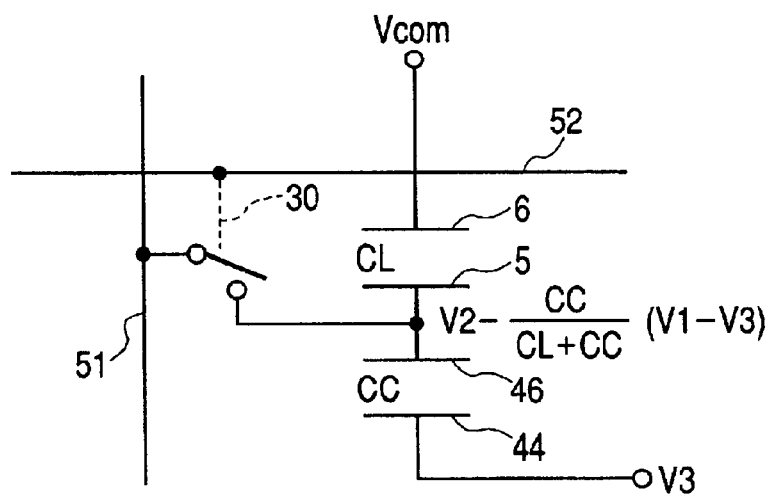
Figure 6C:
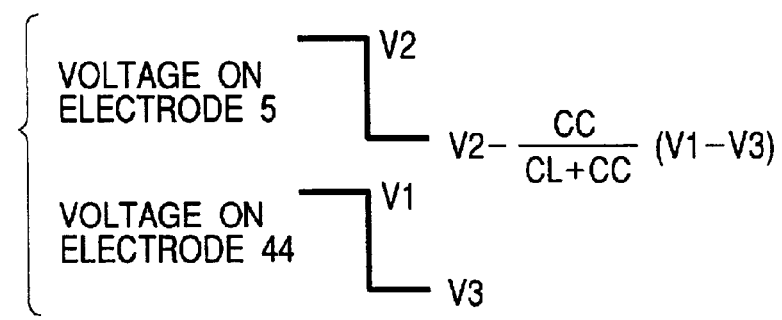
FIG. 6C shows a relationship in voltage between electrodes of the liquid crystal display element.

The following explains a method for varying a voltage of the reflective electrode 5 with respect to the counter electrode 6 by application of a voltage to the first light blocking film 44 by using a capacitor formed between the first and second light blocking films 44, 46 in the structure shown in FIG. 1, by reference to FIGS. 6A–6C. An equivalent circuit for one pixel is illustrated in FIGS. 6A and 6B in which the active element 30 is represented by a switch for clarity. Reference numeral 52 denotes a scanning signal line for supplying signals to turn the active element 30 ON or OFF, and 51 is a video signal line for supplying a video signal to be written into the pixel. As shown in FIGS. 6A and 6B, the reflective electrode 5 and the counter electrode 6 form a first capacitor 53, and the first light blocking film 44 and the second light blocking film 46 form a second capacitor 54. For simplicity, other parasitic capacitances are neglected, and the capacitances of the first capacitor 53 and the second capacitor 54 are denoted by CL and CC, respectively.

As shown in FIGS. 6A and 6C, the first light blocking film 44 serving as one electrode of the second capacitor 54 is supplied with a voltage V1 from some external source. When the active element 30 is turned ON by a scanning signal, a video signal V2 is supplied to the reflective electrode 5 and the second light blocking film 46.

Then, as shown in FIGS. 6B and 6C, at a time the active element 30 is turned OFF, the voltage applied to the first light blocking film 44 is changed from the voltage V1 to a voltage V3. As a result the voltage of the reflective electrode 5 and the second light blocking film 46 becomes V2−CC/(CL+CC)×(V1−V3).

By using the above-explained method for varying the voltage of the reflective electrode 5, a voltage of negative polarity is produced by a voltage applied to the first light blocking film 44 with the reflective electrode 5 being supplied with a voltage of positive polarity, for example. This method for producing a voltage of negative polarity eliminates the need for supplying a voltage of negative polarity, and the peripheral circuit which have conventionally supplied signals of both positive and negative polarities can be configured to supply signal of only one of positive and negative polarities, making possible a low-voltage peripheral circuit and thereby making possible formation of the peripheral circuit by using low-voltage rating components.

Next, the first and second light blocking films 44, 46 will be explained by reference to FIGS. 7–10.

Figure 7:
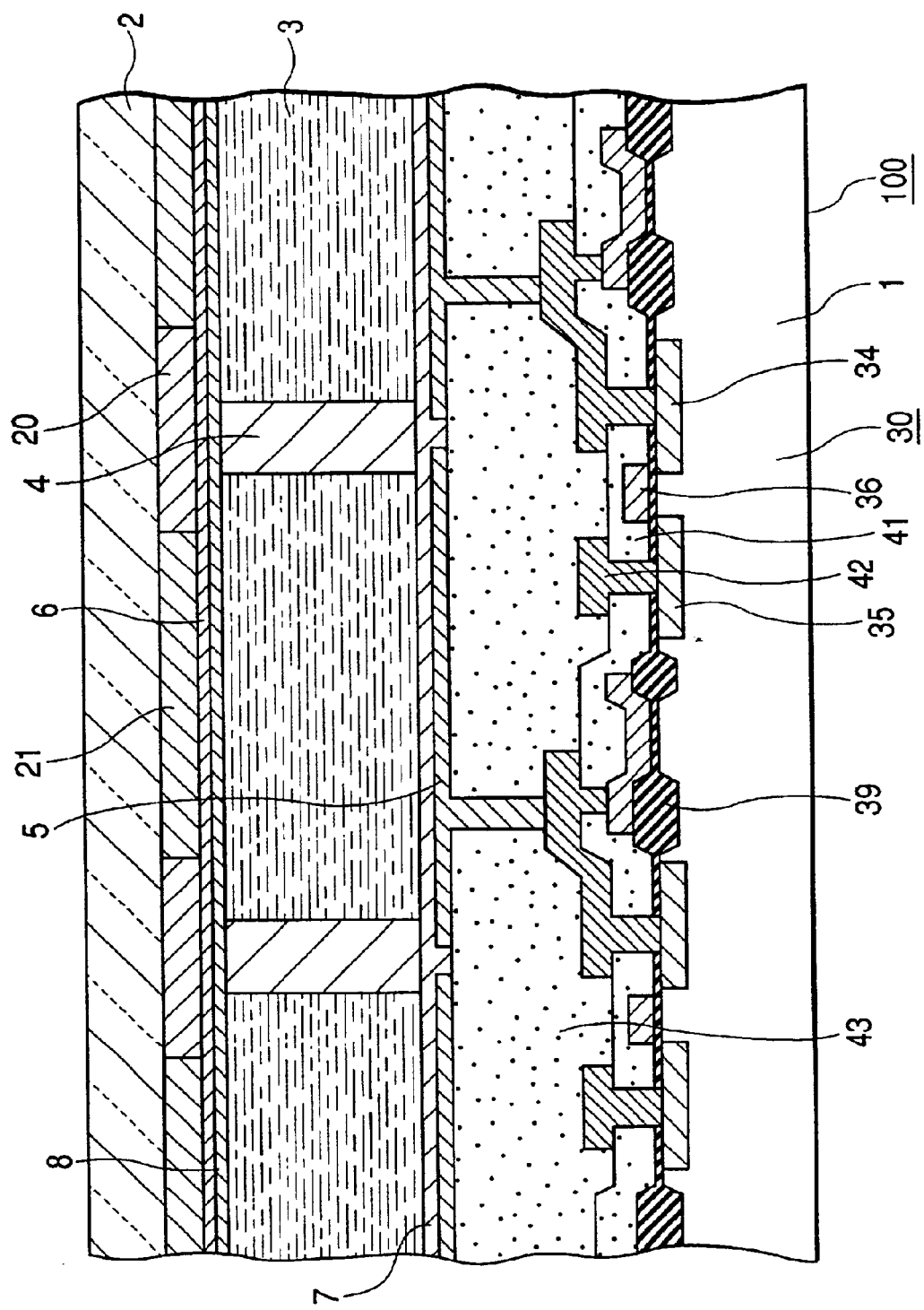
FIG. 7 is a schematic cross-sectional view of a liquid crystal display element for explaining an embodiment of the liquid crystal display device in accordance with the present invention.

As shown in FIG. 7, the reflective electrodes 5 are spaced from each other with a specified gap therebetween to define the respective pixels. Light passes through the gaps, then enters a semiconductor layer of the active element 30, and generates charges (photocarriers) by photoelectric conversion. A portion of the photocarriers flow into the source region, change the video signal having been written into and stored in the reflective electrodes 5, and this is the so-called photoleak problem.

When the intensity of light from the light source is small, a large portion of the light is reflected by the reflective electrodes 5 which have functions of reflect light and shielding circuits underlying the reflective electrodes 5 from light, and consequently, light passing through the gaps does not cause a problem.

However, in the liquid crystal projector, strong light from the light source illuminates the liquid crystal display element 100 to increase luminance of the liquid crystal projector. Also there is a tendency that the display area of the liquid crystal display element decreases with decreasing size of the liquid crystal display element as the size of the liquid crystal projector is reduced, and as a result the illumination intensity on the display area of the liquid crystal display element is reduced further. Consequently, the photoleak cannot be prevented by the reflective electrodes 5(48) and therefore the light blocking films need to employed.

When color filters 21 are disposed on the transparent substrate 2 as shown in FIG. 7, a black matrix 20 made of light blocking films can be formed between the color filters 21. The black matrix 20 is formed so as to surround each of the pixels and this means the black matrix 20 is patterned to block light from illuminating the gaps between the reflective electrodes 5(48). Therefore the black matrix 20 suffices for light blocking in the conventional liquid crystal display elements. But the transparent substrate 2 is spaced from the driving circuit substrate 1, and consequently, the photoleak caused by light entering obliquely cannot be neglected when the intensity of the incident light is increased.

Among the liquid crystal projector, there is a type in which color splitting and recombination are performed outside the liquid crystal display element, and this type of liquid crystal display elements do not incorporate color filters thereinto, and therefore it is not economical in view of manufacturing steps to fabricate the black matrix 20 on the transparent substrate 2 for the purpose of light blocking only. Further, employment of the black matrix 20 in the reflective liquid crystal display element causes a problem of reducing the aperture ratio.

Figure 8:
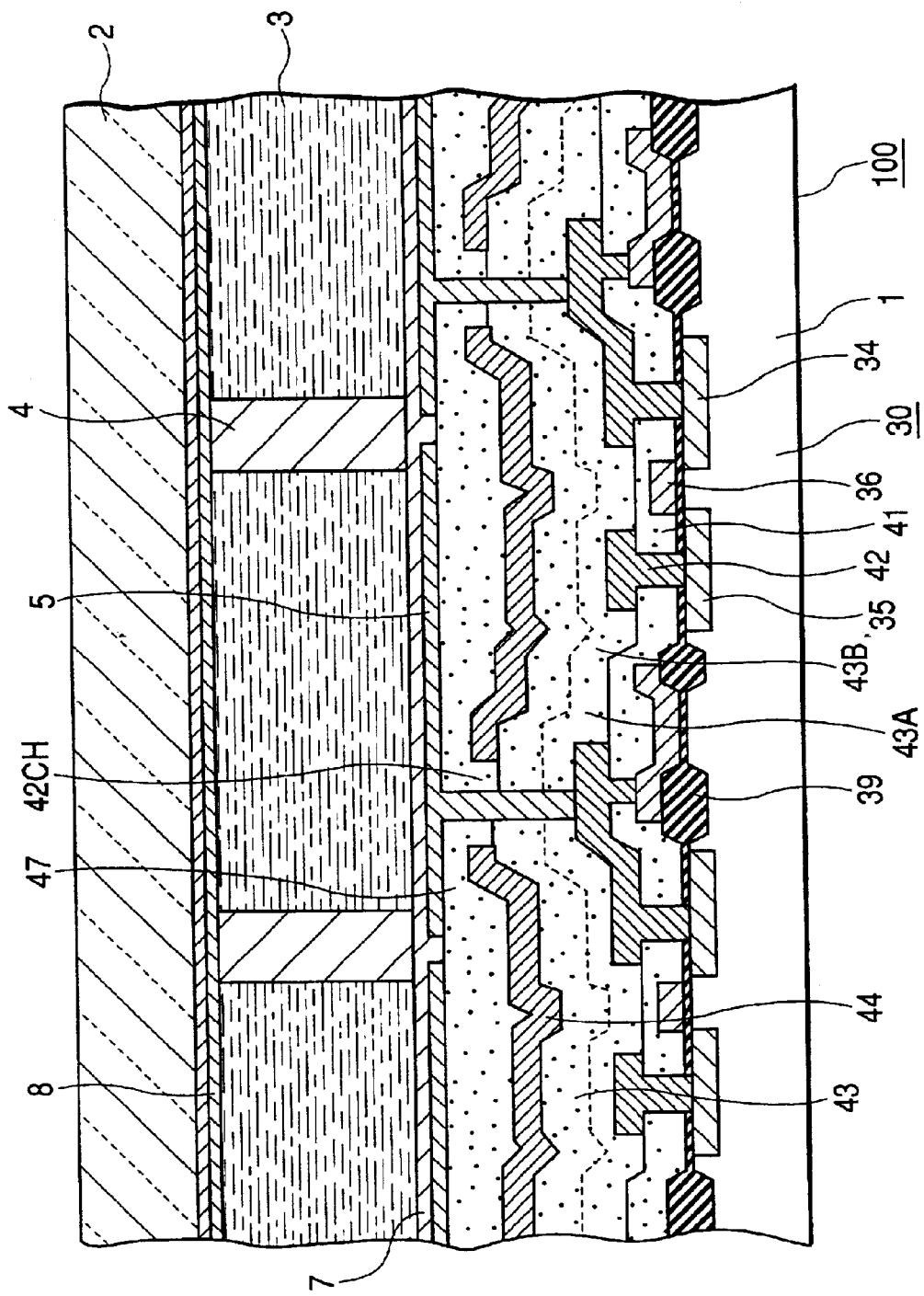
FIG. 8 is a schematic cross-sectional view of a liquid crystal display element for explaining an embodiment of the liquid crystal display device in accordance with the present invention.

As a solution to the above problems, in this embodiment of the present invention, light blocking films are formed on the driving circuit substrate 1 by using process steps similar to those for fabrication of other metal layers in the liquid crystal display element. FIG. 8 illustrates the structure in which the light blocking films 44 are fabricated on the driving circuit substrate 1. The light blocking films 44 can be disposed closely to the semiconductor layer and block the obliquely incident light. Each of the light blocking films 44 can cover the entire area of a corresponding pixel, an opening to be made in the light blocking film 44 is only a contact hole 42CH for electrical connection to the reflective electrode 5, and the amount of light incident on the semiconductor layer is reduced to be very small.

As described above, the liquid crystal projectors have made much progress in increasing its luminance, there is a demand for liquid crystal projectors for use even under normal room lighting condition, and therefore the amount of light illuminating the liquid crystal display element from a light source has been increased.

The present inventors found out that flicker occurs in display due to the leakage of light caused by the increased amount of light even in the structure of FIG. 8. It is conceivable to prevent a problem of light leakage by reducing the size of the openings in the first light blocking films 44 and thereby decreasing the amount of light incident on the semiconductor layer, but in this embodiment second light blocking films are disposed below the openings in the reflective electrodes 5 as an alternative.

Figure 9:
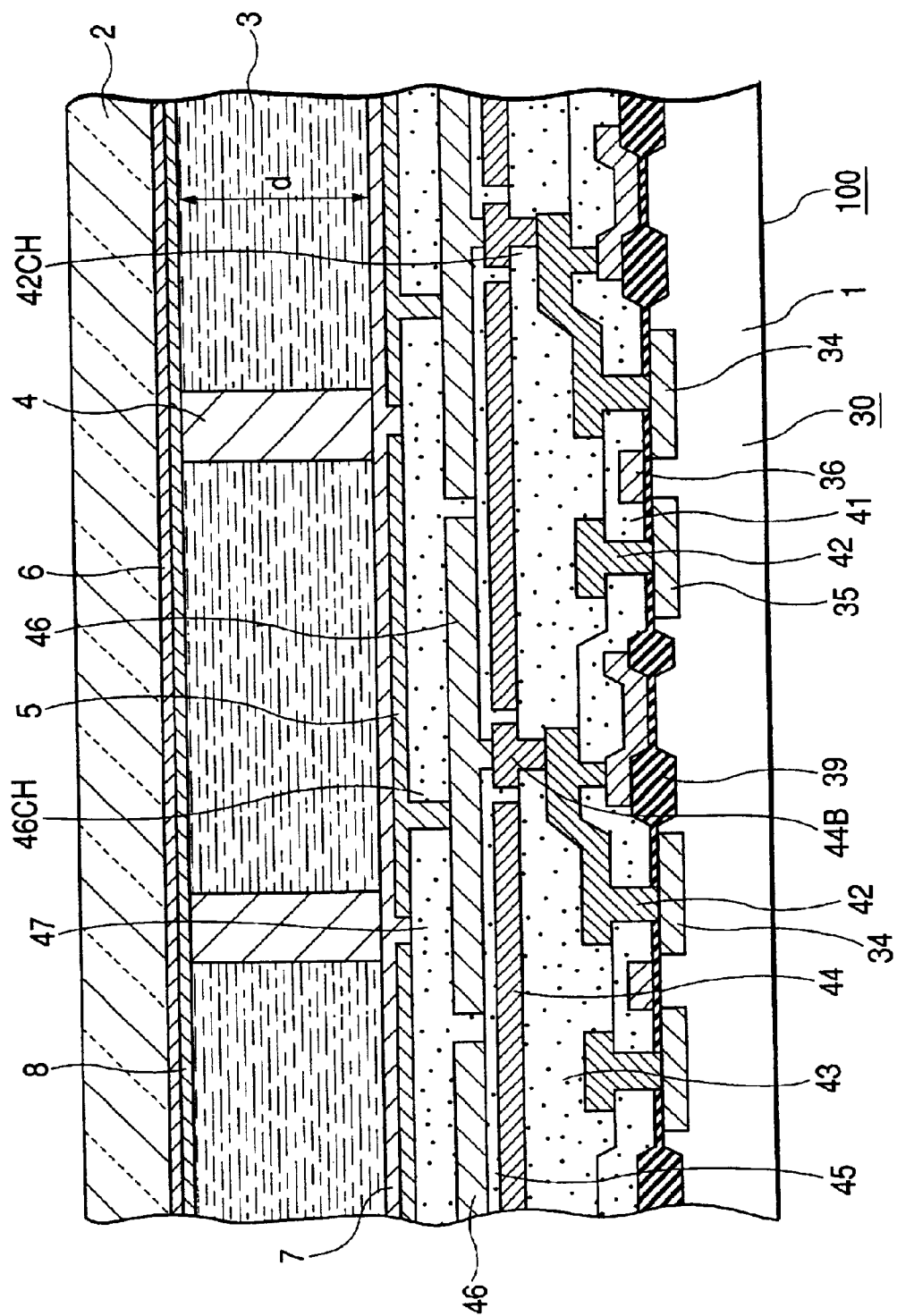
FIG. 9 is a schematic cross-sectional view of a liquid crystal display element for explaining an embodiment of the liquid crystal display device in accordance with the present invention.

The first and second light blocking films 44, 46 are disposed in the embodiments shown in FIGS. 1 and 9. In FIG. 9, a connecting portion between the second light blocking film 46 and the first conductive film 42 has a structure in which a metal film forming the second light blocking film 46 and a metal film 44B made of the same metal as the first light blocking film 44 are laminated, but the second light blocking metal film 46 may be connected directly to the first conductive film 42.

Figure 10:
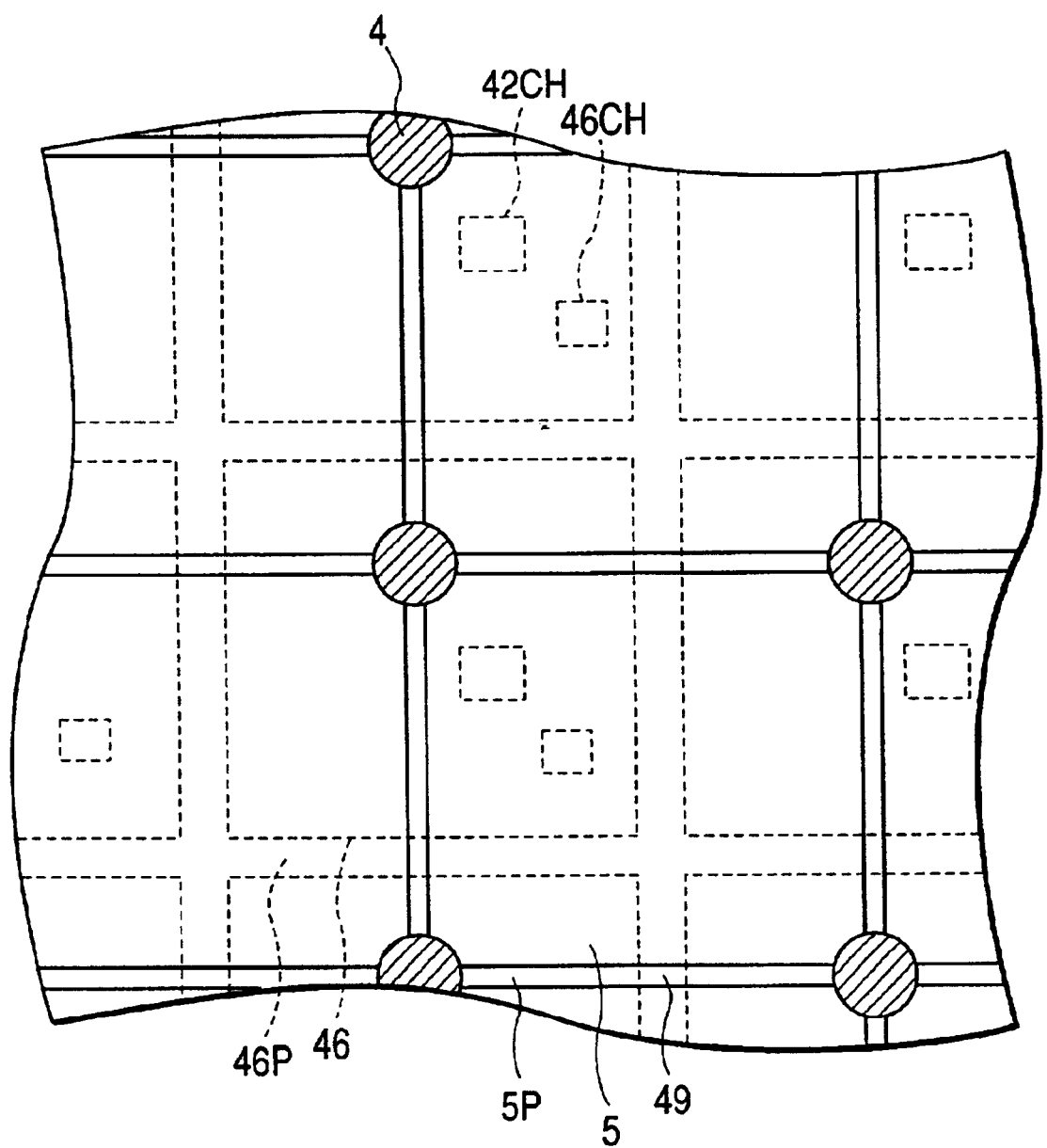
FIG. 10 is a schematic plan view of a liquid crystal display element for explaining an embodiment of the liquid crystal display device in accordance with the present invention.

FIG. 10 is a schematic plan view of the arrangement of the reflective electrodes 5 and the second light blocking films 46 viewed from the liquid crystal layer side with the orientation film being omitted for clarity. As shown in FIG. 10, the second light blocking films 46 are disposed below the reflective electrodes 5 viewed from the liquid crystal layer side, light passes only through exposed portions 49 covered by none of the reflective electrodes 5 and the second light blocking films 46, and consequently, the amount of light incident on the semiconductor layer through the openings in the reflective electrodes 5 is greatly reduced. The size of the respective second light blocking films 46 is made approximately equal to that of the respective reflective electrodes 5, and therefore the second light blocking films 46, are capable of covering most of the area of the openings 5P in the reflective electrodes 5P. As a dimensional example of an individual reflective electrode 5, one reflective electrode 5 is about 8 microns in height and about 8 microns in width, and a gap between the adjacent reflective electrodes 5 is 0.5 microns.

Each of the reflective electrodes 5 is supplied with a video signal associated with a corresponding one of the pixels independently of others of the reflective electrodes 5 associated with others of the pixels, and therefore the adjacent reflective electrodes 5 are separated from each other by openings 5P for electrical isolation. Each of the second light blocking films 46 is also supplied with a video signal associated with a corresponding one of the pixels independently of others of the second light blocking films 46, like the reflective electrodes 5, and therefore the adjacent second light blocking films 46 are separated from each other by openings 46P.

Light can pass through the openings 5P and 46P provided for electrical isolation. The openings 5P in the reflective electrodes 5 are blocked up by the second light blocking film 46 so that light does not enter the semiconductor layer directly, and the openings 46P in the second light blocking films 46 are blocked up by the reflective electrodes 5 so that light does not enter the openings 46 directly. In this way the openings in one of the reflective electrodes 5 and the second light blocking films 46 are blocked up by the other of the reflective electrodes 5 and the second light blocking films 46 so as to enhance the light blocking effect.

However, the openings 5P are not blocked up by the direct contact of the second light blocking films 46 with the openings 5P. The interlayer insulating film 47 is disposed between the reflective electrodes 5 and the second light blocking films 46 so as to insulate them from each other, and consequently, light can propagate in the interlayer insulating film 47. In view of this, the first light blocking films 44 are provided to further prevent light from entering the semiconductor layer. Light can enter the semiconductor layer only through the openings 49, and therefore the amount of light incident on the semiconductor layer is limited, but provision of the first light blocking films 44 can prevent light more securely from entering the semiconductor layer. An opening to be formed in each of the first light blocking films 44 is a contact hole 42CH for provided for each of the pixels. The first light blocking films 44 further block up the openings 49 causing light leakage which cannot be eliminated even by provision of the second light blocking film 46.

Figure 11:
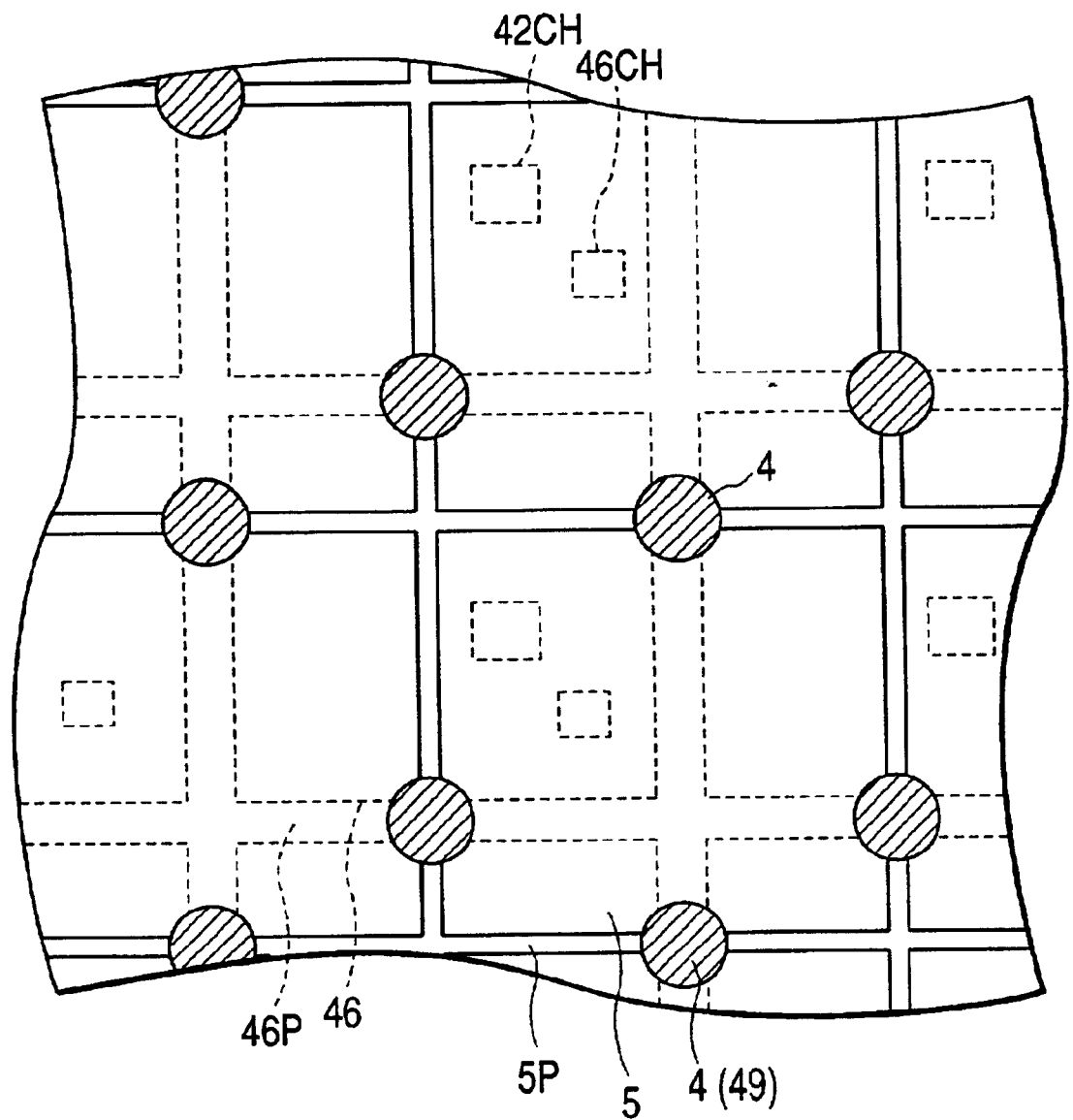
FIG. 11 is a schematic plan view of a liquid crystal display element for explaining an embodiment of the liquid crystal display device in accordance with the present invention.

As shown in FIG. 11, the openings 49 causing light leakage can be blocked up directly by insulating materials. For example, light blocking films can be formed on the light leakage openings 49 by using the same resin material as that of the spacers 4. In FIG. 11, the spacers 4 are disposed on the openings 49. Further, the openings 5P in the reflective electrodes 5 can be blocked up by light blocking resin films.

As described already, capacitors can be formed between the first and second light blocking films 44, 46. The second light blocking films 46 are supplied with the same video signals as those written into the reflective electrodes 5, and therefore the capacitors can be used as the storage capacitances when a fixed voltage is applied to the first light blocking films 44. The second light blocking films 46 which are supplied with video signals function as second reflective electrodes also. As shown in FIG. 10, the second light blocking films 46 are exposed in the openings 5P between the adjacent reflective electrodes 5, and therefore the second light blocking films 46 can apply an electric field to the liquid crystal composition 3 via the fourth interlayer insulating film 47 and the orientation film 7 (see FIG. 1). The second light blocking films 46 are AC-driven in the same manner as the reflective electrodes 5 are, and therefore the liquid crystal composition 3 in the vicinity of the openings 5P can be impressed with voltages whose polarity is inverted periodically, by the second light blocking films 46, and consequently, application of electric fields in a fixed direction, i.e., DC fields, to the liquid crystal composition 3 in the vicinity of the openings 5P is prevented.

Figure 12A:
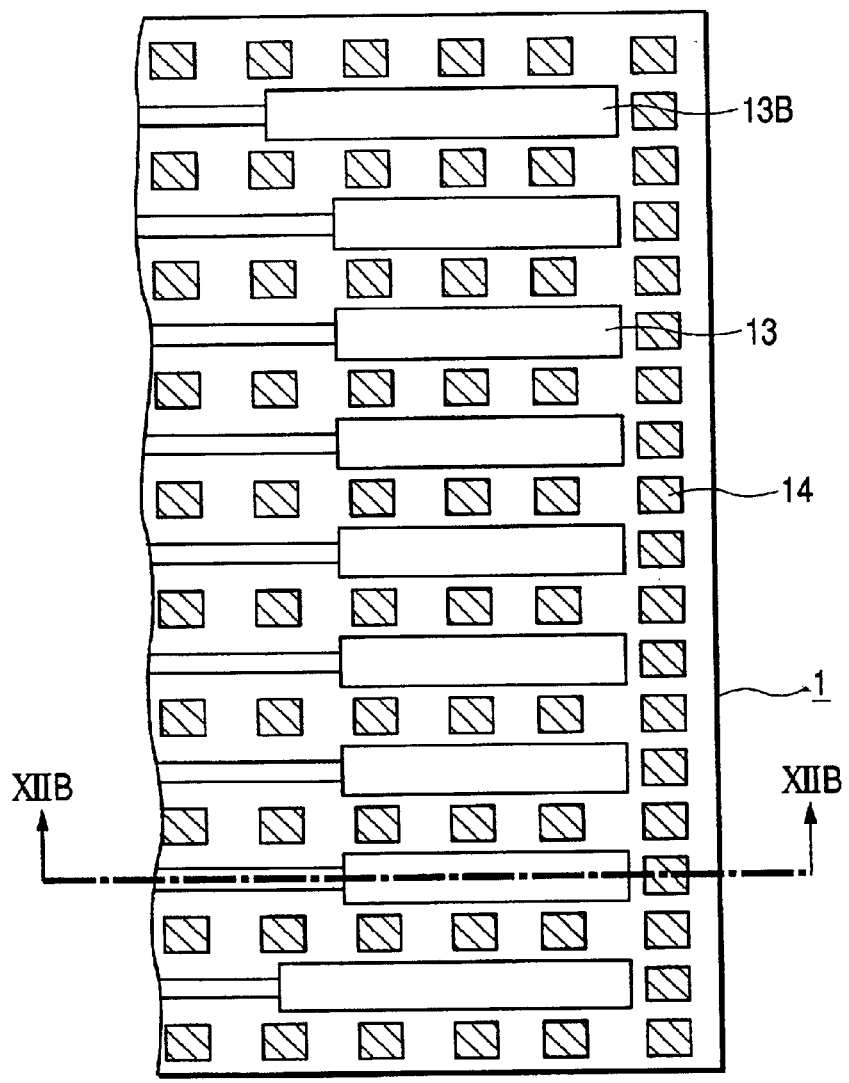
FIG. 12A is a schematic plan view of a terminal portion of a liquid crystal display element for explaining an embodiment of the liquid crystal display device in accordance with the present invention.
Figure 12B:
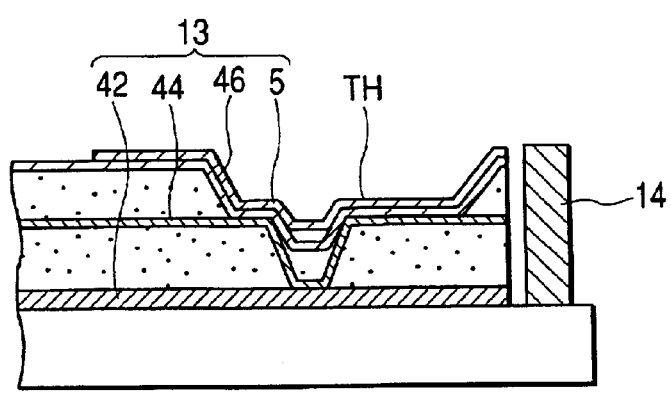
FIG. 12B is a cross-sectional view of the liquid crystal display element taken along line XIIB—XIIB of FIG. 12A.

Next, a dummy pattern formed for making uniform a pattern density within a chip will be explained by reference to FIGS. 12A and 12B. FIGS. 12A and 12B illustrate a dummy pattern 14 formed around the external terminals 13. There are no structures other than the external terminals 13 disposed between the adjacent external terminals on the driving circuit substrate 1 for prevention of electrical shorts in connecting the external terminals to an external circuit, and consequently, the pattern density of the area where the external terminals 13 are disposed is usually lower than that of the remainder of the driving circuit substrate 1. In chemical mechanical polishing, the amount of polishing depends upon the density of uneven structures (the pattern density) of the surface to be polished, and the flatness of the polished surface is degraded due to the unevenness. By disposing the dummy pattern 14 in a area around the external terminals 13 where the pattern density is low, the pattern density of the area around the external terminals is made uniform, and consequently, the subsequent chemical mechanical polishing makes possible a thin film having a uniformly flat surface.

FIG. 12B is a cross-sectional view of the driving circuit substrate 1 taken along line XIIB—XIIB of FIG. 12A. The external terminal 13 is comprised of superposed layers of the first conductive film 42, the first light blocking film 44, the second light blocking film 46 and the reflective electrode 5. To increase the thickness of a conductive film in the connecting portion, the conductive film in the connecting portion is composed of the three superposed layers of the first light blocking film 44, the second light blocking film 46 and the reflective electrode 5. The signal lines disposed within the driving circuits are made of the first conductive film 42, and therefore the first light blocking film 44 and the first conductive film 42 are connected together via a contact hole made in the interlayer insulating film.

Figure 13:
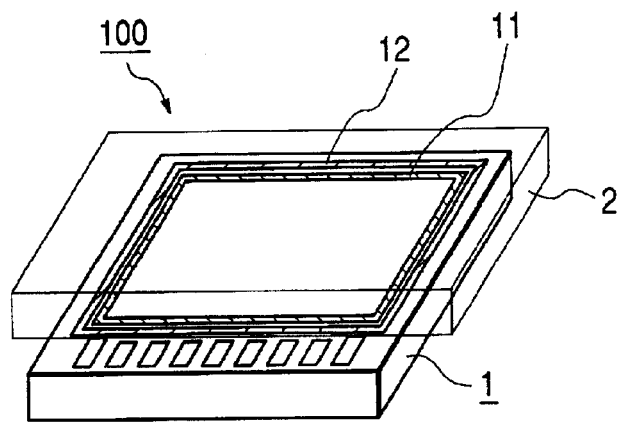
FIG. 13 is a schematic perspective view of an assembled liquid crystal display element for explaining an embodiment of the liquid crystal display device in accordance with the present invention.

FIG. 13 is a perspective view of the driving circuit substrate 1 superposed with the transparent substrate 2. Formed at the periphery of the driving circuit substrate 1 is the peripheral frame 11, and the liquid crystal composition 103 is confined in a space surrounded by the peripheral frame 11, the driving circuit substrate 1 and the transparent substrate 2. The sealing member 12 is coated around the outside of the peripheral frame 11 between the superposed driving circuit substrate 1 and transparent substrate 2. The driving circuit substrate 1 and the transparent substrate 2 are fixed together by the sealing member 2 to form the liquid crystal display element (the liquid crystal display panel) 100.

Figure 14:
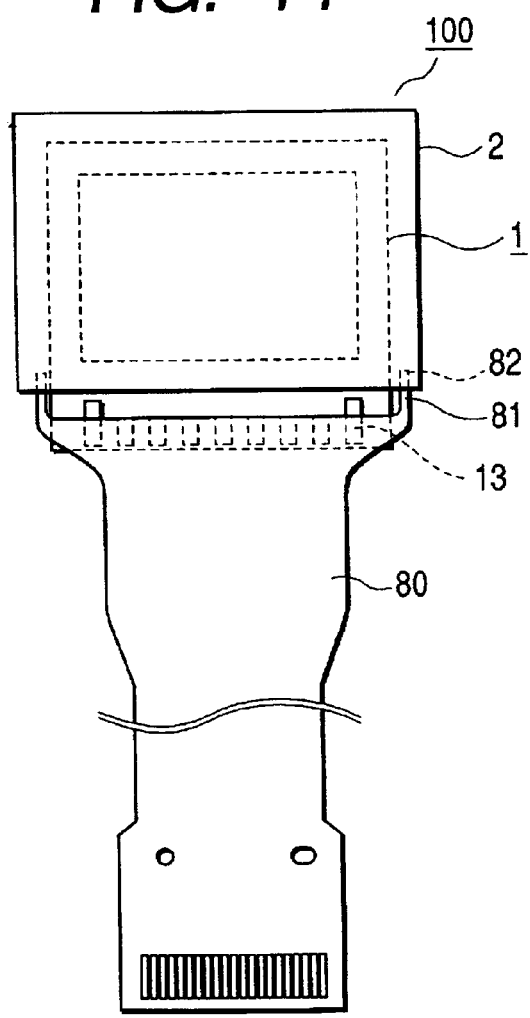
FIG. 14 is a schematic plan view of a liquid crystal display element for explaining an embodiment of the liquid crystal display device in accordance with the present invention.

Next, as shown in FIG. 14, connected to the external terminals 13 is a flexible printed wiring board 80 for supplying external signals to the liquid crystal display element 100. Two outermost terminals on one end of the flexible printed wiring board 80 are made longer than the remainder of terminals to form counter-electrode terminals 81 to be connected to the counter electrode 6 formed on the transparent substrate 2. In this way, the flexible printed wiring board 80 is connected to both of the driving circuit substrate 1 and the transparent substrate 2.

Conventionally, a flexible printed wiring board is connected to external terminals disposed on the driving circuit substrate 1, and therefore the wiring to the counter electrode 6 from the flexible printed wiring board is made via the driving circuit substrate 1.

The transparent substrate 2 in this embodiment of the present invention is provided with connecting portions 82 to be connected to the flexible printed wiring board 80 such that the flexible printed wiring board 80 is connected directly to the counter electrode 6. The liquid crystal display panel 100 is formed by superposing the transparent substrate 102 on the driving circuit substrate 101. The transparent substrate 2 is superposed on the driving circuit substrate 1 such that a peripheral portion of the transparent substrate 2 extends beyond the outside edges of the driving circuit substrate 1 and provides the connecting portions 82 where the flexible printed wiring board 80 is connected to the counter electrode 6.

Figure 15:
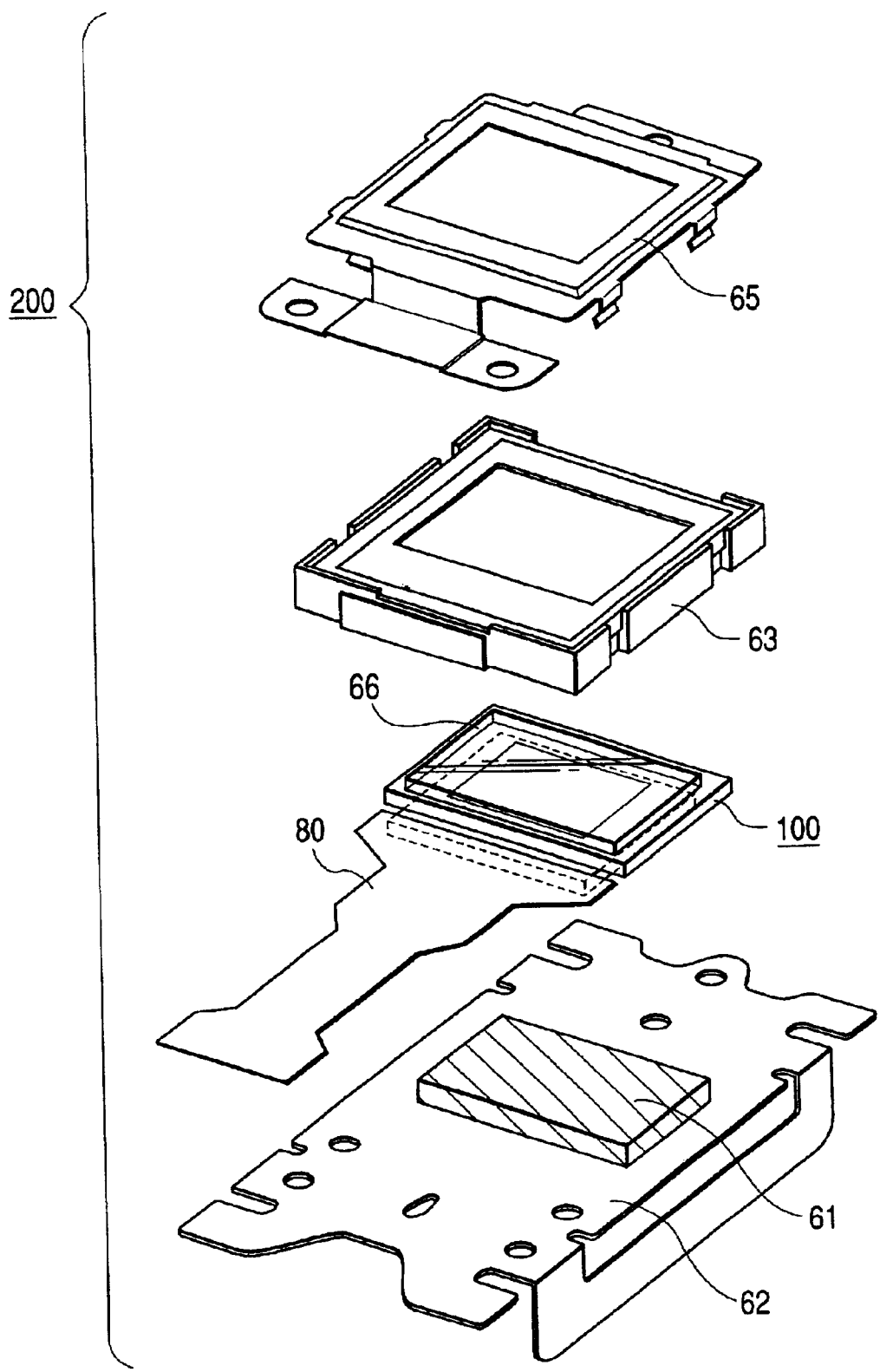
FIG. 15 is an exploded perspective view of an embodiment of the liquid crystal display device in accordance with the present invention.
Figure 16:
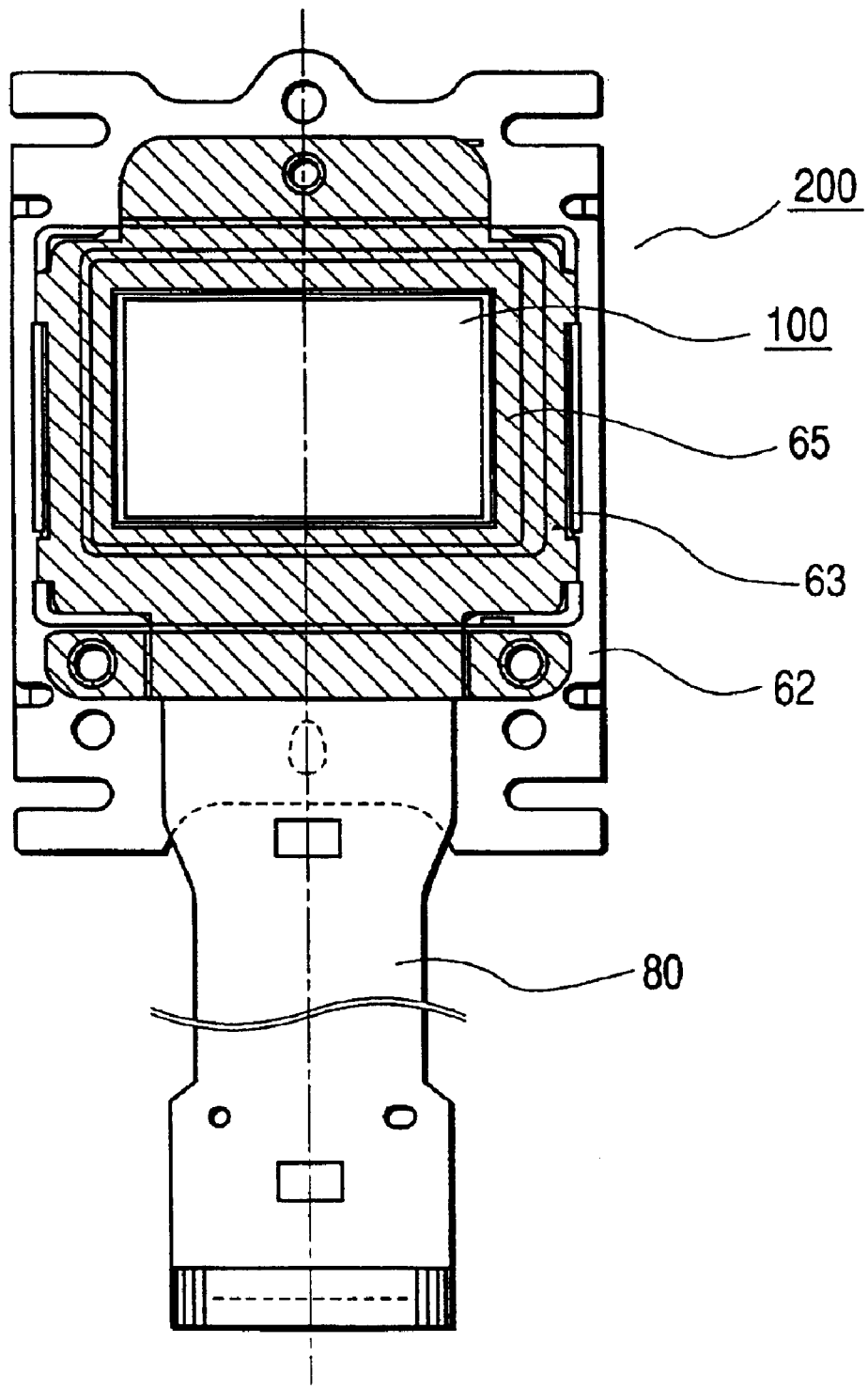
FIG. 16 is a schematic plan view of an embodiment of the liquid crystal display device in accordance with the present invention.
Figure 17:
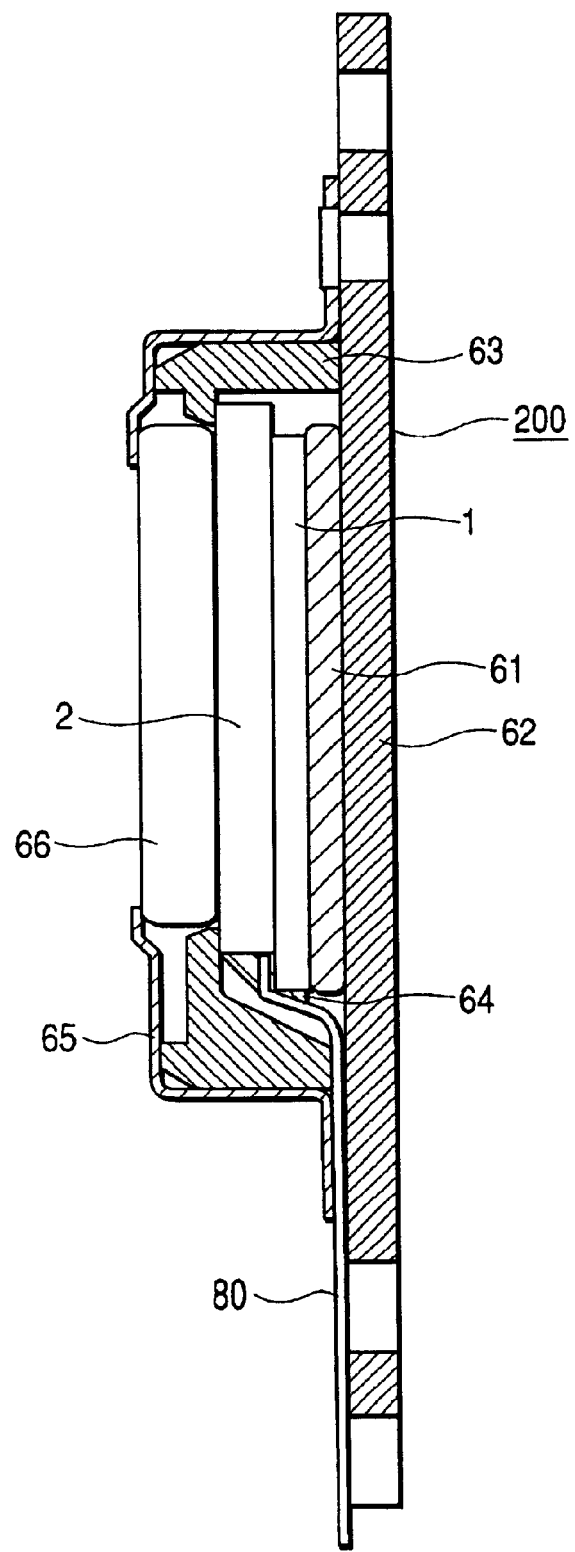
FIG. 17 is a schematic cross-sectional view of the liquid crystal display device of FIG. 16.

FIGS. 15, 16 and 17 illustrate a configuration of the liquid crystal display device 200. FIG. 15 is an exploded view in perspective of the major elements of the liquid crystal display device 200, FIG. 16 is a plan view of the liquid crystal display device 200, and FIG. 17 is a cross-sectional view of the liquid crystal display device of FIG. 16. In FIG. 17, thickness of the respective components is exaggerated for clarity.

As shown in FIG. 15, the liquid crystal display panel 100 having the flexible printed wiring board 80 connected thereto is disposed on the heat-radiating plate 62 with a cushion member 61 interposed therebetween. The cushion member 61 is highly heat-conductive, and fills a gap between the heat-radiating plate 62 and the liquid crystal display panel 100 for heat from the liquid crystal display panel 100 to conduct to the heat-radiating plate 62 easily. Reference numeral 63 denotes a mold case, which is fixed to the heat-radiating plate 62 with an adhesive.

As shown in FIG. 17, the flexible printed wiring board 80 is passed between the mold case 63 and the heat-radiating plate 62, and then is brought out of the mold case 63. Reference numeral 65 denotes a light-blocking plate which prevents light from a light source from entering the unintended portions of the liquid crystal display device 200, and 66 is a light-blocking frame which is made of a glass plate and defines the display area of the liquid crystal display device 200.

As explained above, the present invention is capable of realizing a reflective type liquid crystal display device useful for the liquid crystal projector expected to reduce its size, and increase its resolution and luminance. Further, the present invention realizes a high-display quality reflective type liquid crystal display device, and the present invention realizes a high-display quality liquid crystal display device and a liquid crystal projector employing it by preventing unwanted incident light from occurring in the liquid crystal display element.

What is claimed is:

1. A liquid crystal display device comprising:
   a first substrate;
   a second substrate;
   a liquid crystal layer sandwiched between said first substrate and said second substrate;
   a plurality of reflective electrodes arranged on a surface of said first substrate on a liquid crystal layer side thereof, each of said plurality of reflective electrodes being adapted to be supplied with a video signal;
   a counter electrode disposed on a surface of said second substrate on a liquid crystal layer side thereof:
   a plurality of second light-blocking conductive films disposed below said plurality of reflective electrodes with an insulating layer interposed between said plurality of second light-blocking films and said plurality of reflective electrodes; and
   a first light-blocking film disposed below said plurality of second light-blocking conductive films and formed to cover spacing between said plurality of second light-blocking conductive films;
   each of said plurality of second light-blocking films being electrically connected to a corresponding one of said plurality of reflective electrodes,
   each of said plurality of second light-blocking films being disposed to cover at least a portion of spacings between said corresponding one of said plurality of reflective electrodes and ones of said plurality of reflective electrodes adjacent to said corresponding one of said plurality of reflective electrodes.
   wherein each of said plurality of second light-blocking films forms a capacitance with said first light-blocking film, and a polarity of a voltage supplied to each of said plurality of second light-blocking conductive films is inverted with respect to a voltage applied on said counter electrode at specified time intervals.

2. A liquid crystal display device comprising:
   a driving-circuit substrate;
   a transparent substrate;

a liquid crystal layer sandwiched between said driving-circuit substrate and said transparent substrate;

a plurality of reflective electrodes arranged on a surface of said driving-circuit substrate on a liquid crystal layer side thereof;

a counter electrode disposed on a surface of said transparent substrate on a liquid crystal layer side thereof;

a plurality of semiconductor switching elements disposed below said plurality of reflective electrodes, each of said plurality of semiconductor switching elements being configured to supply a video signal to a corresponding one of said plurality of reflective electrodes;

a first light-blocking film for covering said plurality of semiconductor switching elements; and a plurality of second light-blocking films each disposed to cover at least a portion of spacings between adjacent ones of said plurality of reflective electrodes, each of said plurality of second light-blocking films being electrically connected to a corresponding one of said plurality of reflective electrodes, wherein each of said plurality of second light-blocking films forms a capacitance with said first light-blocking film, and a polarity of said video signal supplied to each of said plurality of reflective electrodes is inverter with respect to a voltage applied on said counter electrode by varying a voltage supplied to said first light-blocking film.

3. A liquid crystal display device comprising:

a first substrate;

a second substrate;

spacers made of resin for establishing a spacing between said first substrate and said second substrate;

a peripheral frame made of said resin and interposed between said first substrate and said second substrate;

a liquid crystal component filled in a space enclosed by said first substrate, said second substrate and said peripheral frame;

a plurality of reflective electrodes arranged on a surface of said first substrate on a liquid crystal layer side thereof;

a counter electrode disposed on a surface of said second substrate on a liquid crystal layer side thereof;

a plurality of dummy electrodes disposed between said plurality of reflective electrodes and said peripheral frame, each of said plurality of dummy electrodes being supplied with a dummy-electrode signal;

a plurality of semiconductor switching elements disposed below said plurality of reflective electrodes, each of said plurality of semiconductor switching elements being configured to supply a video signal to a corresponding one of said plurality of reflective electrodes;

a first light-blocking film for covering said plurality of semiconductor switching elements; and a plurality of second light-blocking conductive films each disposed to cover at least a portion of spacings between adjacent ones of said plurality of reflective electrodes.

wherein each of said plurality of second light-blocking films forms a capacitance with said first light-blocking film, and a polarity of said video signal supplied to each of said plurality of second light-blocking conductive films is inverted with respect to a voltage applied on said counter electrode at specified time intervals.

4. A liquid crystal display device according to claim 3, wherein said dummy-electrode signal is such that said dummy electrodes, disposed between said plurality of reflective electrodes and said peripheral frame, provide a black display.

5. A liquid crystal display device according to claim 3, wherein a polarity of said dummy-electrode signal applied to one of said plurality of dummy electrodes is reversed in synchronism with a said video signal applied to one of said plurality of reflective electrodes adjacent to said one of said plurality of dummy electrodes.

* * * * *